US012746860B2

(12) United States Patent
Hugues et al.

(10) Patent No.: US 12,746,860 B2
(45) Date of Patent: Sep. 29, 2026

(54) RETAINING ELEMENT FOR A COVER RETAINING ASSEMBLY, SET OF RETAINING ELEMENTS, AND COVER RETAINING ASSEMBLY

(71) Applicant: Adient US LLC, Plymouth, MI (US)

(72) Inventors: Laurent Hugues, Soultz les Baines (FR); Francois Mougin, Barr (FR)

(73) Assignee: Adient US LLC, Plymouth, MI (US)

( * ) Notice: Subject to any disclaimer, the term of this patent is extended or adjusted under 35 U.S.C. 154(b) by 237 days.

(21) Appl. No.: 18/712,272

(22) PCT Filed: Nov. 22, 2022

(86) PCT No.: PCT/IB2022/061278
§ 371 (c)(1),
(2) Date: May 22, 2024

(87) PCT Pub. No.: WO2023/094989
PCT Pub. Date: Jun. 1, 2023

(65) Prior Publication Data
US 2025/0010773 A1 Jan. 9, 2025

(30) Foreign Application Priority Data
Nov. 23, 2021 (DE) ..................... 10 2021 213 149.2

(51) Int. Cl.
*B60N 2/58* (2006.01)

(52) U.S. Cl.
CPC .................................. *B60N 2/5816* (2013.01)

(58) Field of Classification Search
CPC ... B60N 2/5816; B60N 2/5825; B60N 2/5841
USPC ....................................................... 297/218.2
See application file for complete search history.

(56) References Cited

U.S. PATENT DOCUMENTS 1,873,607 A 8/1932 Lefevre
4,317,591 A 3/1982 Ramsey
4,865,383 A * 9/1989 Sbaragli ............... B60N 2/5825 297/218.2

(Continued)

FOREIGN PATENT DOCUMENTS

DE 202007018785 U1 * 4/2009 ........... B60N 2/2809
DE 102009051059 B4 6/2011

(Continued)

OTHER PUBLICATIONS

European Patent and Trademark Office, International Search Report and Written Opinion in Application No. PCT/IB2022/061278, dated Feb. 13, 2023, 9 pages, Rijswijk, Netherlands.

*Primary Examiner* — Jose V Chen
(74) *Attorney, Agent, or Firm* — Marshall & Melhorn, LLC

(57) ABSTRACT

A retaining element for a cover retaining assembly of a vehicle seat may have a fastening region for a cover fastening element and at least one anchoring region for foaming into a cushion element. The retaining element is in the form of a one-part, bent wire or a one-part, filiform plastic structure. The bent wire or the filiform plastic structure is shaped in the anchoring region in such a way that at least one anchoring opening is defined which has at least one concavity directed towards the fastening region. A set of multiple retaining elements formed as identical parts may also be used in association with a cover retaining assembly and a vehicle seat.

20 Claims, 5 Drawing Sheets

(56) References Cited

U.S. PATENT DOCUMENTS

| | | | | |
|---|---|---|---|---|
| 2011/0049948 | A1* | 3/2011 | Hobl | B60N 2/5825<br>297/218.2 |
| 2018/0014650 | A1* | 1/2018 | Nakao | A47C 7/185 |
| 2018/0056836 | A1* | 3/2018 | Schacht | B60N 2/70 |
| 2018/0229791 | A1* | 8/2018 | Sugiyama | B60N 2/5825 |

FOREIGN PATENT DOCUMENTS

| | | | | |
|---|---|---|---|---|
| DE | 102016107368 | A1 | 10/2017 | |
| DE | 102017203322 | A1 | 10/2017 | |
| DE | 102021208895 | A1 * | 2/2023 | B60N 2/5825 |
| EP | 2065972 | A1 | 3/2009 | |
| EP | 3065972 | B1 | 1/2020 | |
| GB | 2337291 | A * | 11/1999 | F16B 45/012 |
| WO | WO-2010096933 | A1 * | 9/2010 | B60N 2/5825 |
| WO | WO-2012013174 | A2 * | 2/2012 | B60N 2/5825 |

* cited by examiner

RETAINING ELEMENT FOR A COVER RETAINING ASSEMBLY, SET OF RETAINING ELEMENTS, AND COVER RETAINING ASSEMBLY

FIELD

The invention relates to a retaining element for a cover retaining assembly for attaching a seat cover to a padding element of a seat. The invention further relates to a set of such retaining elements and a vehicle seat having a padding element and a cover retaining assembly.

BACKGROUND

A seat padding assembly which has a fastening part which is molded into a seat padding and a cylindrical shaft is disclosed in DE 10 2017 203 322 A1, wherein the seat padding material is in contact with an outer circumference along at least one part of the length of the cylindrical shaft. Additionally, a separate retaining clip, which is retained by a press fit in a cylindrical opening of the cylindrical shaft, is provided.

A continuous cable or a continuous wire, which accordingly has to be adapted in each case to different types of padding elements and seat covers, is provided as a holder in EP 3 065 972 A1, for example.

It is the object of the present invention to specify a retaining element for a cover retaining assembly for attaching a seat cover to a padding element of a seat, in particular a vehicle seat, wherein the retaining element is configured such that this retaining element withstands tensile forces applied thereto, is of simple construction and permits simple production, in particular mass production and automated production. The object of the present invention is also to specify a set of such retaining elements which permits simple production. Moreover, it is the object of the invention to specify a vehicle seat with a padding element and a simplified cover retaining assembly.

The object is achieved according to the invention by a retaining element which has a fastening region for a cover fastening element and at least one anchoring region for foaming into a padding element, and wherein the retaining element is in the form of a one-part bent wire or a one-part filiform plastic structure, and wherein the bent wire or the filiform plastic structure is shaped in the anchoring region in such a way that at least one anchoring opening is defined which has at least one concavity directed toward the fastening region.

SUMMARY

The advantages achieved by the invention are, in particular, that when storing, transporting and/or sorting a plurality of retaining elements, the entanglement or twisting thereof with one another is substantially avoided. By the concavity it is at least avoided that the retaining elements are permanently or unreleasably twisted with one another. This saves effort and time for separating and sorting the retaining elements.

The concavity is provided to reduce the size of an anchoring opening of the anchoring region such that an entanglement of the anchoring region of a retaining element with other anchoring regions and/or fastening regions of further retaining elements is avoided, without impairing the anchoring opening in terms of its function.

Moreover, a stability and/or stiffness, in particular relative to undesired rotation or turning, in particular relative to torsion, of at least the anchoring region of the retaining element are/is increased by the concavity.

The wire or the plastic structure can be shaped, for example, such that the anchoring opening is configured as at least one loop. The anchoring opening extends, for example, perpendicularly to the fastening region of the retaining element. Such an anchoring opening permits the greatest possible penetration and molding of foam material around the retaining element, when the padding element is foamed.

In one possible embodiment, the anchoring opening is divided into two by the concavity. At least two loops, with in each case an associated opening portion, can be configured, for example, in the anchoring region.

For example, the concavity separates the anchoring opening into an upper and lower or front and rear opening portion. The opening portions are provided in each case for anchoring a cover fastening element and/or a passing fastening element. In the event that an anchoring region of a first retaining element is interlocked between the concavity and an opening portion of a second retaining element, they can be separated from one another in a simple manner. As a result, the retaining elements can be sorted and arranged in a magazine in a simple manner.

In a further embodiment, an overall width of the anchoring region corresponds to an opening width of the anchoring opening, in particular one of the opening portions, so that the anchoring regions of two retaining elements do not become twisted and/or entangled in one another in such a manner that they are unreleasable or difficult to release from one another. In the event of the interlocking, twisting, entangling and/or jamming of an anchoring region of a first retaining element in an anchoring region of a further retaining element, the anchoring regions can be separated in a simple manner from one another, for example by pulling apart.

The retaining elements are configured as identical parts. By the formation of a plurality of identical parts in wire form, in particular as uniformly bent wires, they can be provided by the same production and processing steps and attached to the cover retaining assemblies by identical attaching steps. By forming identical parts, the cover retaining assemblies can be used for different types of padding elements, in particular for padding elements having different padding thicknesses and padding shapes. At the same time, such a cover retaining assembly which is made of wire-shaped identical parts permits a secure tensile strength and fixing of a seat cover to be attached to a padding element. Moreover, when manufacturing the padding element, in particular a foam padding element, such a plurality of wire-shaped identical parts can be assembled and molded in the padding element in a simple manner. Moreover, such a cover retaining assembly with a plurality of wire-shaped identical parts is suitable for molding or foaming into the padding element for an improved automated manufacturing process.

In one possible embodiment, the retaining element or the retaining elements is or are configured in each case in one piece or integrally. For example, the respective retaining element is manufactured from a wire, in particular a metal wire.

In one possible embodiment, the wire-shaped retaining element is configured as a bent profile wire. For example, the wire-shaped retaining element is configured from a metal wire, in particular a steel wire. For example, the wire-shaped retaining element has an H-shape or a butterfly shape or a spectacles shape or a wing shape.

For example, the retaining elements are configured as uniformly bent wires, in particular uniformly bent metal wires, in particular uniformly bent steel wires.

In a further embodiment, each wire-shaped retaining element has a fastening region and two anchoring regions protruding therefrom. The fastening region is formed, for example, by a central web of the H-shape, the spectacles shape or butterfly/wing shape. The two anchoring regions are formed, for example, by longitudinal webs of the H-shape or by wings of the butterfly/wing shape. The two anchoring regions have in each case a concavity. In each case, the concavity is directed, for example bent in or pushed in, toward the fastening region which is configured as a central web.

Moreover, the respective anchoring opening can have a radially open slot. As a result, the retaining element can be shaped, in particular simply bent, from a single wire with two wire ends.

A set according to the invention comprises a plurality of retaining elements formed as identical parts, wherein the at least one anchoring opening of each retaining element is configured such that the retaining elements which are interlocked, entangled or twisted with one another can be released from one another.

In particular, the at least one anchoring opening of each retaining element can be configured such that loosely arranged retaining elements are not connected together, for example are not interlocked, twisted or entangled with one another.

The cover retaining assembly according to the invention for attaching a seat cover to a padding element of a seat comprises at least a plurality of wire-shaped retaining elements which in each case have at least one fastening region and at least one anchoring region with a concavity.

A seat assembly for a seat of a vehicle comprises at least one cover retaining assembly, as has been described above, a padding element and a seat cover with at least one engagement element for receiving the respective fastening region of the retaining elements, wherein the plurality of retaining elements, which are configured in particular as identical parts, are anchored in each case in the padding by the at least one anchoring region. The anchoring region has two opening portions which are separated by the concavity and which in each case are configured for mounting in and/or on the padding element and/or by fastening elements arranged on the padding element and/or fastening elements arranged on the cover. The padding element, in particular, is a foam padding element, for example made of foamed synthetic resin.

A vehicle seat according to the invention comprises at least one padding element with such a set of retaining elements configured as identical parts and such a cover retaining assembly, comprising a seat cover which comprises a plurality of engagement elements, in particular fastening elements, which can be releasably fastened to the retaining elements arranged in the padding element.

The anchoring regions can be inserted into the padding element, in particular by molding, encapsulating, injection molding or overmolding, wherein the fastening regions are arranged in each case in the region of an opening which is open in the direction of the seat cover. The engagement elements of the seat cover can be coupled or releasably fastened via the opening to the fastening regions of the retaining elements in the padding element.

In one possible embodiment, the identical parts are molded into the padding element at least in some regions or encapsulated by a padding material in some regions. For example, at least the anchoring region or the anchoring regions of the respective identical part is or are molded into or encapsulated by the padding material in the padding element.

Moreover, the padding element has a plurality of openings in which in each case a fastening region of one of the identical parts for the engagement element of the seat cover is arranged so as to be freely accessible. The plurality of openings can correspond to the plurality of fastening regions of the identical parts. Alternatively, a plurality of fastening regions of a plurality of identical parts can be arranged so as to be freely accessible in a common opening in the padding element.

One possible embodiment provides that the engagement element of the seat cover is configured as a hook element, a clamping body, a staple body, an annular body or a U-shaped profile body. This permits the fastening regions to be received in a simple manner by the engagement elements for fastening the seat cover to the cover retaining assembly with the partially molded-in or encapsulated wire-shaped identical parts. The at least one engagement element, or the plurality of engagement elements, and the fastening regions of the plurality of identical parts is or are designed such that they fasten and retain the seat cover on the padding element in a connected-together state. In particular, the number of identical parts corresponds to the number of engagement elements. This permits a simple construction of the seat assembly and a simple assembly.

Moreover, such a cover retaining assembly consisting of a plurality of wire-shaped identical parts permits a particularly thin padding element, in particular foam padding element. Due to the wire shape or the configuration of the identical parts as uniformly bent wires, in particular metal wires, they have a small height in the millimeter range and thus permit a particularly thin padding element. For the secure anchoring of the identical parts in the padding element and for fastening the engagement elements of the seat cover to the identical parts, in terms of their dimensions these identical parts have a greater width and length relative to the height.

The use of the wire-shaped identical parts enables the manufacturing process to be further automated, irrespective of the type of padding element, since the wire-shaped identical parts can be positioned in a simple manner in a cavity by a robot.

In comparison with the long wires which are different according to the type of padding, the small wire-shaped identical parts also require less storage space and are simple to transport, pack and store.

DESCRIPTION OF THE FIGURES

Exemplary embodiments of the invention are described in more detail with reference to the drawings. In the drawings.

DETAILED DESCRIPTION

Parts which correspond to one another are provided in all of the figures with the same reference signs.

Figure 1:
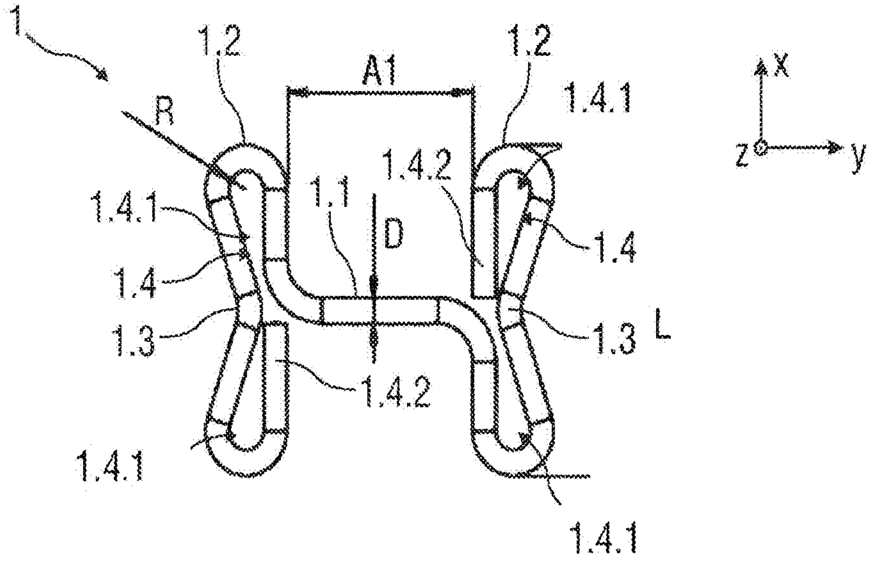
FIG. 1 shows in a plan view a wire-shaped retaining element for a cover retaining assembly.
Figure 2:
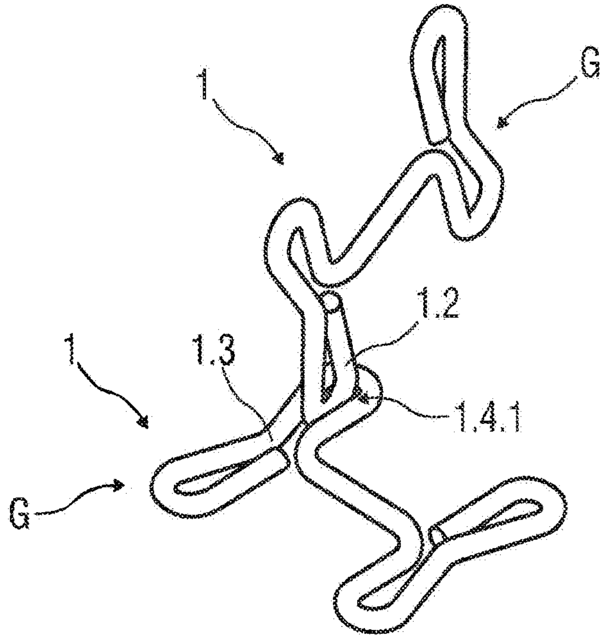
FIG. 2 shows schematically in a perspective view two wire-shaped retaining elements, in particular retaining elements configured as identical parts which are interlocked with one another.

FIG. 1 shows schematically in a plan view a wire-shaped retaining element 1 for a cover retaining assembly 2.

A retaining element 1, shown schematically in FIG. 1, is described hereinafter by using three spatial directions running perpendicularly to one another. For example, in a vehicle seat 100 installed in the vehicle (shown in FIG. 10) a longitudinal direction x runs substantially horizontally and preferably parallel to a vehicle longitudinal direction which corresponds to the usual direction of travel of the vehicle. A transverse direction y running perpendicularly to the longitudinal direction x is also horizontally oriented in the vehicle and runs parallel to a vehicle transverse direction. A vertical direction z runs perpendicularly to the longitudinal direction x and perpendicularly to the transverse direction y. In the vehicle seat 100 installed in the vehicle, the vertical direction z preferably runs parallel to a vehicle vertical axis.

The wire-shaped retaining element 1 has a fastening region 1.1 and two anchoring regions 1.2. The anchoring regions 1.2 have in each case a concavity 1.3 oriented inwardly, in particular in the direction of the fastening region 1.1. For example, the retaining element 1 has a constriction. For example, in the respective anchoring region 1.2 the retaining element 1 has a substantially V-shaped concavity 1.3. By the respective concavity 1.3, each anchoring region 1.2 is configured to be substantially in a figure of eight (8-shaped) or B-shaped or loop-shaped, in particular bow-shaped with two loops.

Alternatively, the wire-shaped retaining element 1 can have a fastening region 1.1 and an anchoring region 1.2.

The retaining element 1 comprises an anchoring opening 1.4 which is configured by the anchoring region 1.2. The anchoring opening 1.4 is provided to retain fastening elements, such as for example engagement elements 4 (shown in FIG. 6, also called the cover fastening element or padding fastening element), on the retaining element 1. The anchoring opening 1.4 of one respective anchoring region 1.2 is divided by the concavity 1.3 into a plurality of, in particular two, opening portions 1.4.1. For example, the concavity 1.3 separates or divides the anchoring opening 1.4 into an upper and lower or front and rear opening portion 1.4.1. The opening portions 1.4.1 are provided in each case for anchoring a cover fastening element and/or a padding fastening element, such as the engagement element 4 (shown in FIG. 6).

For example, the retaining element 1 has a constriction over its entire width. The overall width refers to a dimension running in the transverse direction y.

For example, the retaining element 1, in particular the wire-shaped retaining element 1, has a wire diameter D of ca. 2 mm.

For example, the retaining element 1 has an overall length L of ca. 26 mm. The overall length L refers to a dimension running in the longitudinal direction x.

For example, the retaining element 1 has a spacing A1 in the millimeter range, for example of ca. 16 mm or in a range of 10 mm to 20 mm, between the two anchoring regions 1.2. The spacing A1 corresponds to the width of the fastening region 1.1.

For example, the retaining element 1 has a radius R of ca. 1.5 mm in the region of the anchoring opening 1.4, in particular an opening portion 1.4.1.

The wire-shaped retaining element 1 is configured as a repeatedly bent profile wire. For example, the wire-shaped retaining element 1 is configured as a uniformly and repeatedly bent wire, in particular a uniformly bent metal wire, in particular a uniformly bent steel wire. For example, the wire-shaped retaining element 1 has an H-shape or a spectacles shape or a butterfly shape or a wing shape.

The retaining element 1 can be configured, in particular, as a one-part bent wire. Alternatively, the retaining element 1 can be configured as a one-part filiform plastic structure, for example a plastic fiber structure. The bent wire or the filiform plastic structure is shaped in the anchoring region 1.2 so as to define the at least one anchoring opening 1.4 which has the at least one concavity 1.3 oriented in the direction of the fastening region 1.1.

The wire-shaped retaining element 1 shown has, for example, the centrally arranged fastening region 1.1 and two anchoring regions 1.2 protruding therefrom. The fastening region 1.1 is formed by a central web of the H-shape, spectacles shape or butterfly/wing shape. The two anchoring regions 1.2 are formed by longitudinal webs of the H-shape or by wings of the butterfly/wing shape or circular shape or frame shape of the glasses of the spectacles shape.

The anchoring opening 1.4 of the respective retaining element 1 can also comprise a radially open slot 1.4.2. The respective radially open slot 1.4.2 of the two anchoring openings 1.4, which laterally adjoin the central fastening region 1.1, is formed by the respective end of the bent wire or the filiform plastic structure of the retaining element 1.

While the various retaining elements 1 described hereinafter have the above-described features, fastening regions 1.1 and anchoring regions 1.2 provided on both sides with anchoring openings 1.4 with the concavities 1.3 of the retaining element 1, they only differ in terms of shape, for example bow shape, loop shape, wing shape, spectacles shape or the like.

Figure 5:
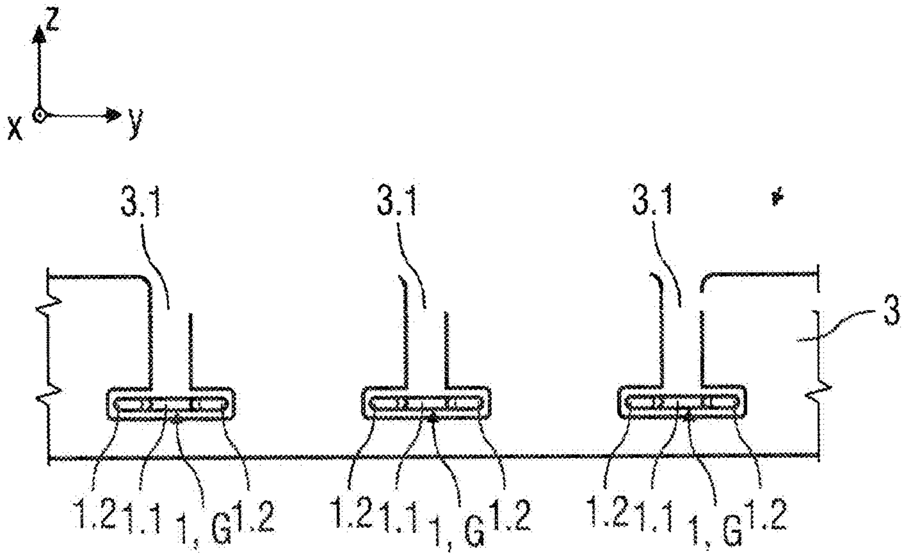
FIG. 5 shows schematically in a sectional view a padding element with a partially molded-in cover retaining assembly with a plurality of wire-shaped retaining elements.
Figure 7:
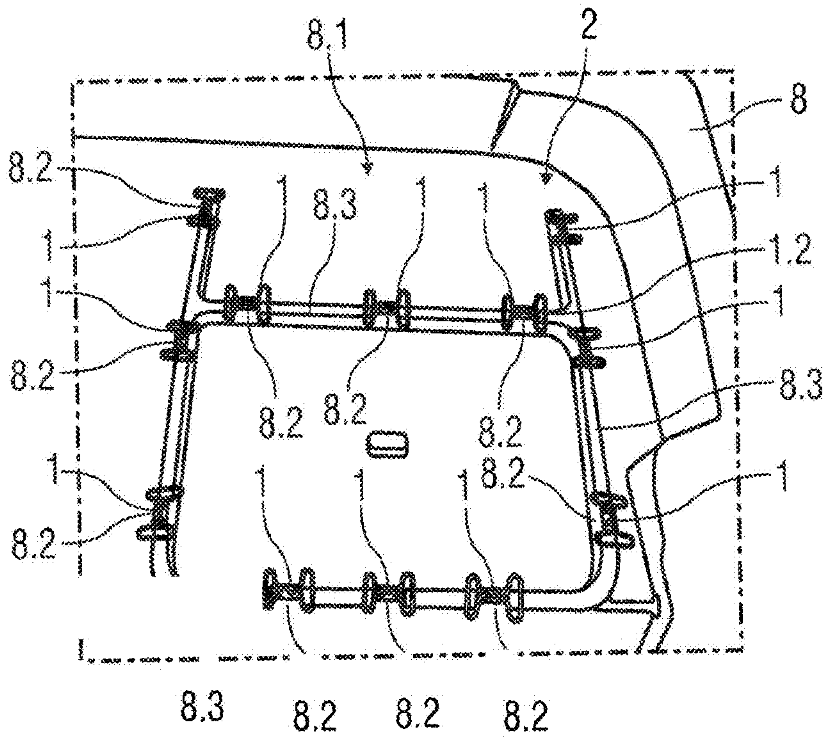
FIG. 7 shows schematically a tool for manufacturing a padding element with a cavity and a plurality of receivers for arranging a plurality of wire-shaped retaining elements of a cover retaining assembly.

A cover retaining assembly 2, as shown in FIGS. 5 and 7, comprises as a set a plurality of uniformly bent wire-shaped retaining elements 1. The retaining elements 1 are configured as identical parts G. The respective wire-shaped identical part G has a small height, in particular in the millimeter range, for example of a maximum of 2 mm.

Figure 3:
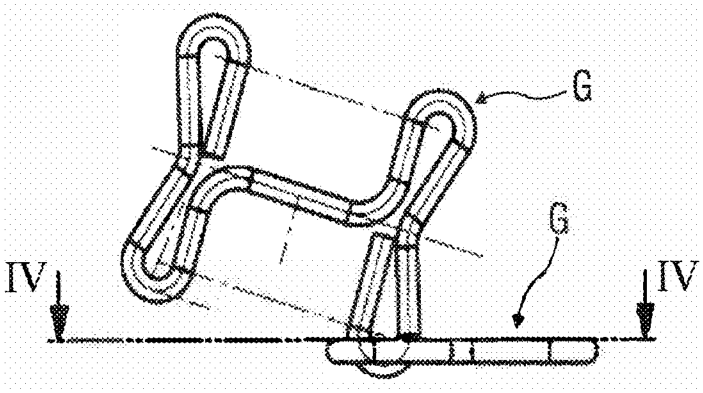
FIG. 3 shows schematically in a side view two wire-shaped retaining elements, in particular retaining elements configured as identical parts which are interlocked with one another.
Figure 4:
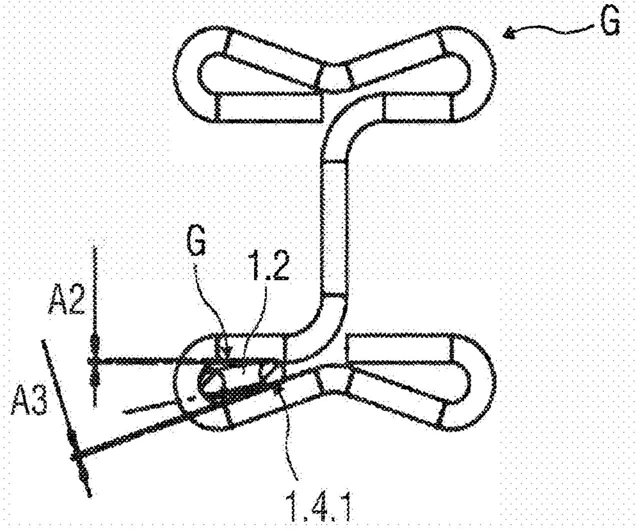
FIG. 4 shows schematically in a sectional view two wire-shaped retaining elements, in particular retaining elements configured as identical parts which are interlocked with one another.

FIGS. 3 to 5 show schematically in a perspective view, a side view and a sectional view two wire-shaped retaining elements 1, in particular retaining elements 1 which are configured as identical parts G which are interlocked with one another. In the event that an anchoring region 1.2 of a first retaining element 1 is interlocked between the concavity 1.3 and an opening portion 1.4.1 of a second retaining element 1, they can be separated in a simple manner from one another. As a result, if the retaining elements 1 are twisted, entangled and/or interlocked, they can be easily separated from one another, sorted and arranged in a magazine. As indicated in FIG. 5, a height of the retaining element 1 approximately corresponds to a width of an opening portion 1.4.1.

For example, in the event of the anchoring region being interlocked and/or jammed in an opening portion 1.4.1 of a further retaining element 1, the anchoring region 1.2 is arranged in the region of the concavity 1.3 spaced apart from the inner faces of the opening portion 1.4.1, so that the interlocked and/or jammed anchoring region 1.2 can be separated in a simple manner from the opening portion 1.4.1. The spacings A2, A3 are ca. 0.2 mm. A height of the retaining element 1 is accordingly smaller than a width of the opening portion 1.4.1.

FIG. 5 shows schematically in a sectional view a padding element 3 with a partially molded-in cover retaining assembly 2 with a set of a plurality of wire-shaped or filiform retaining elements 1 as identical parts G.

The padding element 3 comprises a plurality of openings 3.1. The openings 3.1 in the padding element 3 can be configured to be slotted or cylindrical. However, other suitable geometries of the openings are possible. The anchoring regions 1.2 are inserted into the padding element 3, in particular the foam material of the padding element 3 is molded or injection molded around said anchoring regions. The fastening region 1.1 of the respective retaining element 1 is arranged so as to be freely accessible in the internal end region of the respective opening 3.1.

Figure 6:
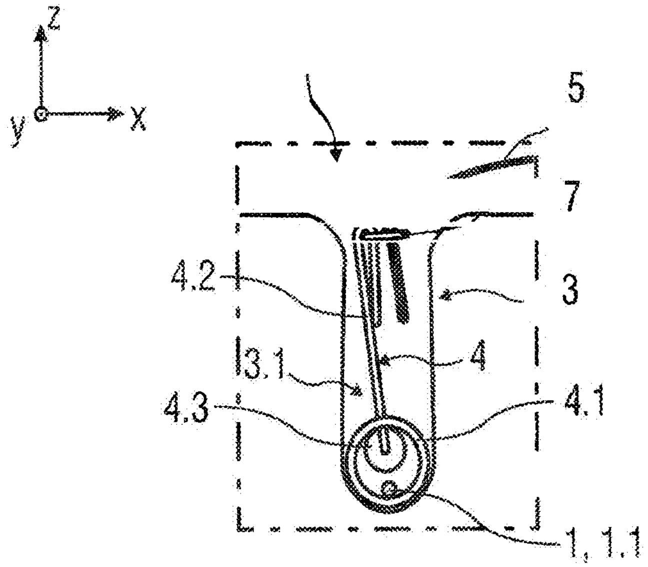
FIG. 6 shows schematically in a sectional view a partial region of a seat assembly in the region of a wire-shaped retaining element which is partially molded into a padding element and in which an engagement element of seat cover engages and is retained for fastening the seat cover to the padding element.

FIG. 6 shows schematically in a sectional view a partial region of a seat assembly 6 in the region of a wire-shaped retaining element 1 which is partially molded into the padding element 3 with its anchoring regions 1.2, and an engagement element 4 of a seat cover 5 engages on the fastening region 1.1 thereof for fastening the seat cover 5 to the padding element 3. The seat assembly 6 can be, for example, a backrest 104 or a seat part 102 of the vehicle seat 100 which is shown by way of example in FIG. 10.

The seat cover 5 can be configured in multiple parts, as shown. The seat cover 5 extends over a contoured outer surface of the padding element 3. The padding element 3, in particular, is foam padding, in particular a foam shell of the backrest 104 or of the seat part 102 of the vehicle seat 100 (shown in FIG. 10).

The padding element 3 comprises openings 3.1 at which the seat cover 5 is held in situ on the padding element 3 by its engagement elements 4 which are coupled to identical parts G of the cover retaining assembly 2. The openings 3.1 in the padding element 3 can be configured to be slotted or cylindrical. However, other suitable geometries of the openings are also possible.

In this exemplary embodiment, the respective engagement element 4 comprises a hook element 4.1 or a different suitable element, such as a clamping body, staple body, an annular body or a U-shaped profile body or a so-called hog ring.

A coupling element 4.2, for example a flexible band, a metal wire, a textile band or a plastic strip, can also be provided for connecting the hook element 4.1 to the seat cover 5. The coupling element 4.2 has the hook element 4.1 at one end and is connected to the seat cover 5, for example by a fastening seam 7, at the other opposing end which faces the seat cover 5. Optionally the coupling element 4.2 can be provided at the end of the hook element 4.1 with a receiving element 4.3, in particular a ball-shaped element, for receiving and movably connecting the hook element 4.1.

Such a cover retaining assembly 2 with a plurality of wire-shaped identical parts G permits a variable seat cover holder which can be used for a plurality of different types of padding elements 3. The plurality of engagement elements 4 and the fastening regions 1.1 of the plurality of identical parts G are designed such that they fasten and retain the seat cover 5 on the padding element 3 in a connected-together state. The number of identical parts G can correspond to the number of engagement elements 4. This permits a simple construction of the seat assembly 6 and a simple assembly.

FIG. 7 shows schematically a tool 8 for manufacturing a padding element 3 which is configured as a seat part 102 (shown in FIG. 10) with a cavity 8.1 and a plurality of receivers 8.2 for arranging a plurality of retaining elements 1 which are configured as identical parts G of a cover retaining assembly 2.

Figure 8:
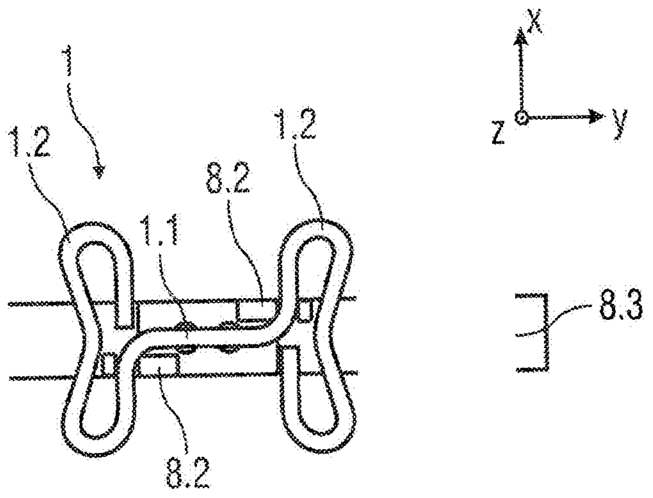
FIG. 8 shows schematically in a plan view receivers for a wire-shaped retaining element.

FIG. 8 shows schematically in a plan view the receivers 8.2 for a wire-shaped retaining element 1.

The receivers 8.2 are configured as pin-shaped, bolt-shaped or cylindrical elevations protruding from the bottom of the cavity 8.1. Two receivers 8.2 are provided for each wire-shaped identical part G. The two receivers 8.2 are arranged obliquely opposing one another so that in each case the fastening region 1.1 bears on one side against one of the receivers 8.2 and thus is laterally secured and positioned.

The receivers 8.2 can also be arranged on a support 8.3, for example a longitudinal or bottom support, on the bottom of the cavity 8.1. The fastening region 1.1 is directly positioned at the free end of the receiver 8.2. The anchoring regions 1.2 are configured as free ends and protrude freely over the receivers 8.2, so that they are enclosed and thus encapsulated by the padding material when a padding material is filled into the cavity 8.1.

In the method for manufacturing the padding element 3 for a seat component, for example a seat part 102 or a backrest 104 (both shown in FIG. 10), a corresponding tool 8 comprises a corresponding cavity 8.1 which has a plurality of receivers 8.2 on which a plurality of wire-shaped identical parts G is arranged, in each case the identical parts having at least one fastening region 1.1 and at least one anchoring region 1.2, wherein after the tool 8 is closed a padding material is introduced into the respective cavity 8.1 for shaping the padding element 3, and foamed and cured therein, such that the wire-shaped identical parts G are anchored with their at least one anchoring region 1.2 in the padding element 3 and are freely accessible with their fastening regions 1.1 in the region of the openings 3.1 of the padding element 3, as shown in FIGS. 5 and 6. The padding element 3 is shaped by foaming in the respective cavity 8.1, wherein the cover retaining assembly 2, in particular the anchoring regions 1.2 of the wire-shaped identical parts G, are foamed and encapsulated at the same time as the shaping by foaming.

Due to the plurality of wire-shaped identical parts G as the cover retaining assembly 2 for the seat cover 5, the manufacturing method can be used for different types of padding elements 3 since the cover retaining assembly 2 for the different types of padding elements 3 only differs by the number of wire-shaped identical parts G and the positioning thereof in the respective padding element 3.

Figure 9:
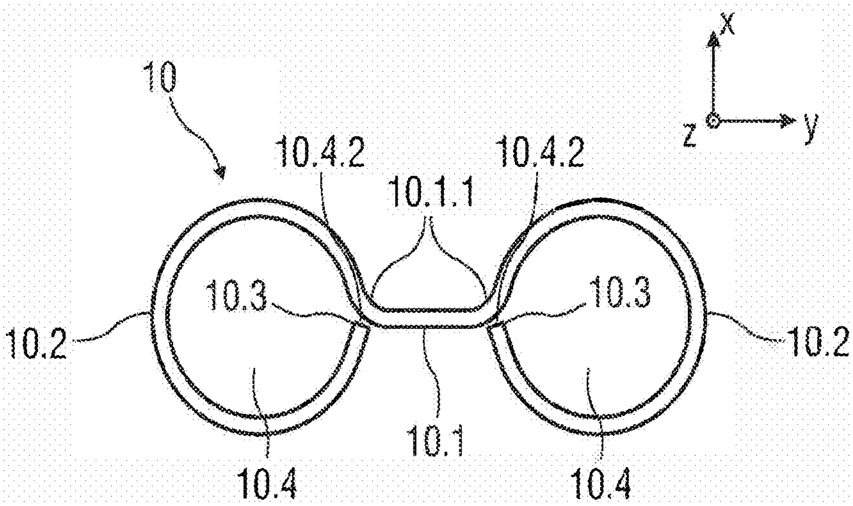
FIG. 9 shows schematically in a plan view an alternative embodiment of a retaining element.

FIG. 9 shows schematically in a plan view a further embodiment for a retaining element 10 of the cover retaining assembly 2 which is configured as a wire-shaped identical part G. The function and the purpose of the retaining element 10 according to FIG. 9 are the same as for the retaining elements 1 according to FIGS. 1 to 8.

The wire-shaped retaining element 10 only differs from the wire-shaped retaining element 1 in terms of shape.

The retaining element 10 is formed from a single bent wire. The single wire of the respective retaining element 10 is bent to form two circles which are connected together via a web 10.1. The web 10.1 forms the fastening region 1.1. The circles form in each case the anchoring region 1.2 with the associated anchoring opening 10.4. The free wires ends 10.3 of the single wire bear in each case in the bent state against one of the ends 10.1.1 of the web 10.1 or are arranged through a radially open slot 10.4.2 at a spacing from the ends 10.1.1. The single wire of the respective retaining element 10 can be pre-bent to form two anchoring regions 10.2 which are connected via the web 10.1.

Figure 10:
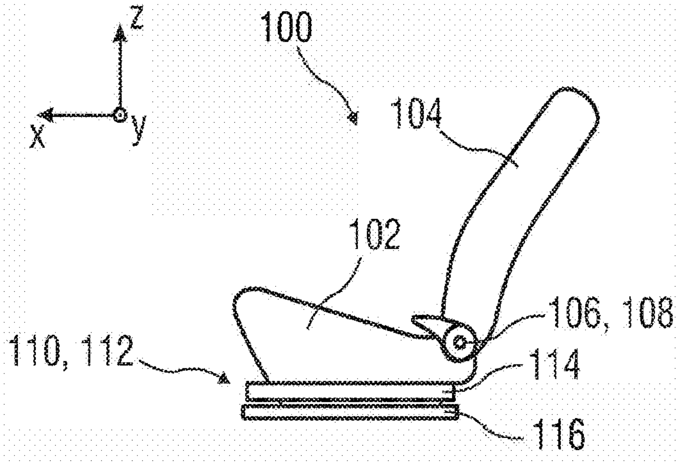
FIG. 10 shows in a schematic view a vehicle seat with a longitudinal adjustment device according to the prior art.

FIG. 10 shows an example of a vehicle seat 100 which is described hereinafter by way of three spatial directions which run perpendicularly to one another. In a vehicle seat 100 installed in the vehicle, a longitudinal direction x runs substantially horizontally and preferably parallel to a vehicle longitudinal direction which corresponds to the usual direction of travel of the vehicle. A transverse direction y running perpendicularly to the longitudinal direction x is also horizontally oriented in the vehicle and runs parallel to a vehicle transverse direction. A vertical direction z runs perpendicularly to the longitudinal direction x and perpendicularly to the transverse direction y. In a vehicle seat 100 installed in the vehicle, the vertical direction z preferably runs parallel to a vehicle vertical axis.

The positional information and directional information which is used, such as for example front, rear, top and bottom, refer to a viewing direction of an occupant seated in the vehicle seat 100 in the usual seating position, wherein the vehicle seat 100 is installed in the vehicle in a position of use which is suitable for passenger conveyance with an upright backrest 104 and is oriented in the direction of travel as is usual. The vehicle seat 100, however, can also be installed or moved in a different orientation, for example transversely to the direction of travel. Unless described differently, the vehicle seat 100 is constructed mirror-symmetrically to a plane running perpendicularly to the transverse direction y.

The backrest 104 can be pivotably arranged on a seat part 102 of the vehicle seat 100. To this end, the vehicle seat 100 optionally can comprise a fitting 106, in particular an adjustment fitting, rotary fitting, latching fitting or wobble fitting.

The positional information and directional information which is used, such as for example radial, axial and in the circumferential direction, refer to an axis of rotation 108 of the fitting 106. “Radial” means perpendicular to the axis of rotation 108. “Axial” means in the direction of or parallel to the axis of rotation 108.

The vehicle seat 100 can optionally comprise a longitudinal adjustment device 110. The longitudinal adjustment device 110 comprises, for example, a rail assembly 112 with a first rail element 114 and a second rail element 116. The first rail element 114 is adjustable relative to the second rail element 116 in the longitudinal direction x. The first rail element 114 is fastened to the seat part 102. The second rail element 116 is fastened to a structural element of a vehicle, for example a vehicle floor.

The backrest 104 and the seat part 102 can comprise in each case the above-described padding element 3 with the cover retaining assembly 2, with the seat cover 5 and the set of retaining elements 1, 10, which are configured as identical parts G for fastening the seat cover 5 to the padding element 3 (shown in detail in FIGS. 5 and 6).

LIST OF REFERENCE SIGNS

1, 10 Retaining element
1.1 Fastening region
10.1 Web
10.1.1 End
1.2, 10.2 Anchoring region
1.3 Concavity
10.3 Wire end
1.4, 10.4 Anchoring opening
1.4.1 Opening portion
1.4.2, 10.4.2 Slot
2 Cover retaining assembly
3 Padding element
3.1 Opening
4 Engagement element
4.1 Hook element
4.2 Coupling element
4.3 Receiving element
5 Seat cover
6 Seat arrangement
7 Fastening seam
8 Tool
8.1 Cavity
8.2 Receiver
8.3 Support
100 Vehicle seat
102 Seat part
104 Backrest
106 Fitting
108 Axis of rotation
110 Longitudinal adjustment device
112 Rail assembly
114 First rail element (upper rail)
116 Second rail element (lower rail)
A1 to A3 Spacing
D Wire diameter
G Identical part
L Overall length
R Radius
x Longitudinal direction
y Transverse direction
z Vertical direction

The invention claimed is:

1. A retaining element for a cover retaining assembly of a vehicle seat, wherein the retaining element has a fastening region for a cover fastening element and at least one anchoring region encapsulated by a padding element, and wherein the retaining element is in the form of a one-part bent wire wherein the bent wire is shaped as two circles connected via a web, wherein the two circles comprise the at least one anchoring region, and the web comprises the fastening region.

2. The retaining element as claimed in claim 1, wherein the wire is shaped such that the at least one anchoring region comprises two anchoring openings configured as symmetric loops.

3. The retaining element as claimed in claim 1, wherein the two circles extend from the fastening region away from one another.

4. The retaining element as claimed in claim 1, wherein at least two loops, with in each case an associated opening portion, are configured in the at least one anchoring region.

5. The retaining element as claimed in claim 1, wherein two anchoring regions protrude from the fastening region.

6. The retaining element as claimed in claim 1, wherein the element has a spectacles shape.

7. The retaining element as claimed in claim 6, further comprising a radially open slot between a free end of the wire and the web.

8. A set of retaining elements formed as identical parts as claimed in claim 1, wherein loosely arranged retaining elements of the set of retaining elements are prevented from being connected together.

9. A cover retaining assembly for attaching a seat cover to the padding element of the vehicle seat, wherein the cover retaining assembly comprises the set of retaining elements configured as identical parts, as claimed in claim 8, which in each case have the fastening region and the at least one anchoring region.

10. A vehicle seat, comprising:

a seat cover, and a set of retaining elements for a cover retaining assembly of the vehicle seat, wherein the set of retaining elements is configured as identical parts, wherein each retaining element in the set has a fastening region for a cover fastening element and at least one anchoring region encapsulated by a padding element, wherein each retaining element is in the form of a one-part bent wire, wherein the bent wire is shaped in the at least one anchoring region in such a way that at least one anchoring opening is defined, wherein the bent wire comprises two circles connected via a web, wherein the two circles comprise the at least one anchoring region, and the web comprises the fastening region, wherein the seat cover comprises a plurality of engagement elements which can be releasably fastened to the set of retaining elements arranged in the padding element.

11. The vehicle seat as claimed in claim 10, wherein the anchoring regions are encapsulated in the padding element and the fastening regions are arranged in each case in the region of an opening which is open in the direction of the seat cover.

12. The retaining element as claimed in claim 1, wherein the one-part bent wire is symmetrical about an axis orthogonal to the web.

13. The retaining element as claimed in claim 1, wherein free ends of the wire are positioned at ends of the web.

14. The retaining element as claimed in claim 1, wherein the one-part bent wire is formed by bending a straight wire in a single plane.

15. The retaining element as claimed in claim 1, wherein the one-part bent wire comprises a flat part.

16. The retaining element as claimed in claim 1, wherein the one-part bent wire comprises a planar wire.

17. The retaining element as claimed in claim 1, wherein no portion of the one-part bent wire crosses above or below any other portion of the one-part bent wire.

18. The retaining element as claimed in claim 1, further comprising an overall thickness, wherein the one-part bent wire comprises a wire diameter, wherein the wire diameter defines the overall thickness.

19. The retaining element as claimed in claim 1, wherein the two circles are spaced from one another by the web.

20. The retaining element as claimed in claim 1, wherein the web comprises a straight portion of the wire along a line between centers of the circles.

* * * * *